United States Patent

Zeek

[15] 3,680,707
[45] Aug. 1, 1972

[54] FILTER DRIER
[72] Inventor: Elwood R. Zeek, Crittenden, Va.
[73] Assignee: Virginia Chemical Inc., Portsmouth, Va.
[22] Filed: July 30, 1971
[21] Appl. No.: 167,721

[52] U.S. Cl. ..................210/266, 210/282, 210/352
[51] Int. Cl. ..............................................B01d 27/02
[58] Field of Search..............210/266, 282, 350, 352

[56] References Cited

UNITED STATES PATENTS

| 3,170,872 | 2/1965 | Balogh et al. | 210/266 |
| 3,407,936 | 10/1968 | Balogh | 210/282 |

FOREIGN PATENTS OR APPLICATIONS

| 662,016 | 4/1963 | Canada | 210/282 |
| 684,809 | 4/1964 | Canada | 210/266 |

*Primary Examiner*—Samih N. Zaharna
*Attorney*—David H. Semmes

[57] ABSTRACT

A filter drier used for refrigerants, particularly a filter drier housing embodying a medial desiccant storage chamber with fiberglass pads at either side of the desiccant storage chamber and adjacent the entrance and exit ports. The fiberglass pad adjacent the entrance port includes a means for forcing the filter pad against the desiccant without compressing the pad and thereby increasing its filtering ability.

8 Claims, 2 Drawing Figures

PATENTED AUG 1 1972  3,680,707

INVENTOR
ELWOOD R. ZEEK

BY *David H. Semmes*

ATTORNEY

3,680,707

FILTER DRIER

BACKGROUND OF THE INVENTION

FIELD OF THE INVENTION

Filter driers of the type employing bead desiccants together with one or more fiberglass filtration pads. In a loose bead-type filter drier used for refrigerants, conventional design has embodied a fiberglass filter pad which is spring-loaded against the beads to keep them from vibrating during refrigerant flow. This spring load has been applied to the fiberglass pad at one end of the assembly. A perforated metal support plate has been employed to transmit the spring force uniformly to the fiberglass pad. This load compresses the fiberglass in contact with the support plate to approximately one-fifth of its original thickness, changing its original filtration characteristics and increasing its density a variable amount, depending upon the spring load and limiting the filtration depth. Consequently, its ability to filter fine particles size dirt may be greatly increased. In conjunction with the small hole size and only 30 percent open area of the perforated support plate and the limited depth of filtration into the pad, these characteristics lead to quick clogging of the filter pad filtration area by a small amount of dirt.

The spring load is dissipated in the beads and the lower or second fiberglass filter pad remains uncompressed and retains its good filtration characteristics.

SUMMARY OF THE INVENTION

According to the applicant's invention, the upper fiberglass filter pad is supported between a cover plate and cup such that the spring load is not transmitted through the fiberglass pad. As a result, the fiberglass pad is uncompressed and maintains its original density. This increases the ability of the fiberglass to adsorb dirt through its entire thickness and over its entire area, increasing the amount of dirt filtered by over 1,000 percent.

In addition, the cover plate and cup has been modified to have greatly increased open area to facilitate the use of all the surface cross-section of the fiberglass. Conventional perforated support plates have 30 percent open area. Applicant's new design will use from 50 to 75 percent open area perforated metal.

Also, the density of this first stage or upper fiberglass filter pad is less than the density of the outlet stage or lower fiberglass pad to enable the combination of inlet stage and outlet stage pad to both do filtering and filter a greater total amount of dirt and to a lower micron size.

DESCRIPTION OF THE PREFERRED EMBODIMENTS

Figure 1:
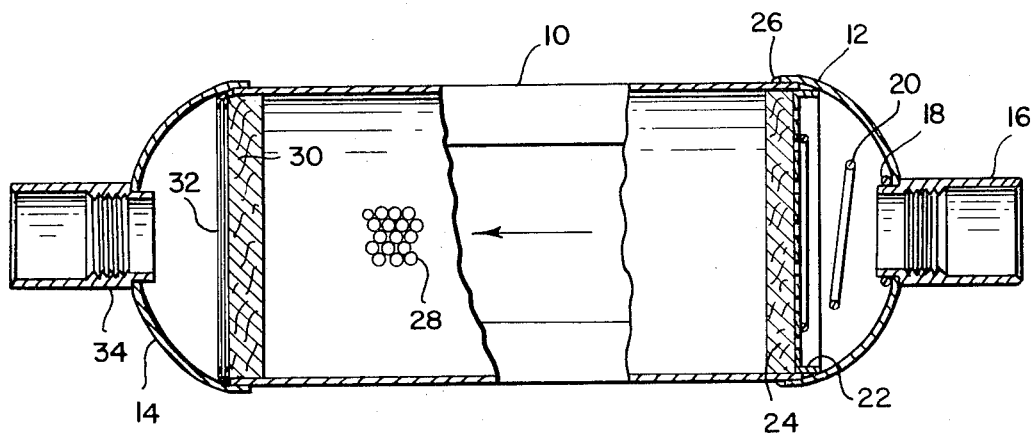
FIG. 1 is a horizontal sectional view of a conventional filter drier.

In FIG. 1, desiccant storage chamber 10, containing bead desiccant 28, is illustrated as having end closure assemblies 12 and 14, entrance port 16, and exit port 34.

Beads of desiccant 28 are supported intermediate filter filtration pads 24 and 30. First pad 24 is supported adjacent filter pad support 32 which is perforated so as to admit refrigerant, and a compression spring medium 20 may be interposed between support 22 and entrance port 16 which it encircles, as at 18.

A closure members may be secured to the housing at 26 by means of brazing material or the like. As will be apparent, as the compression spring 20 acts upon pad support 22, filter pad 24 is correspondingly compressed against desiccant 28. This compression of the filter pad and the relatively limited perforation of plate 24 severely limit the filtration characteristics.

Figure 2:
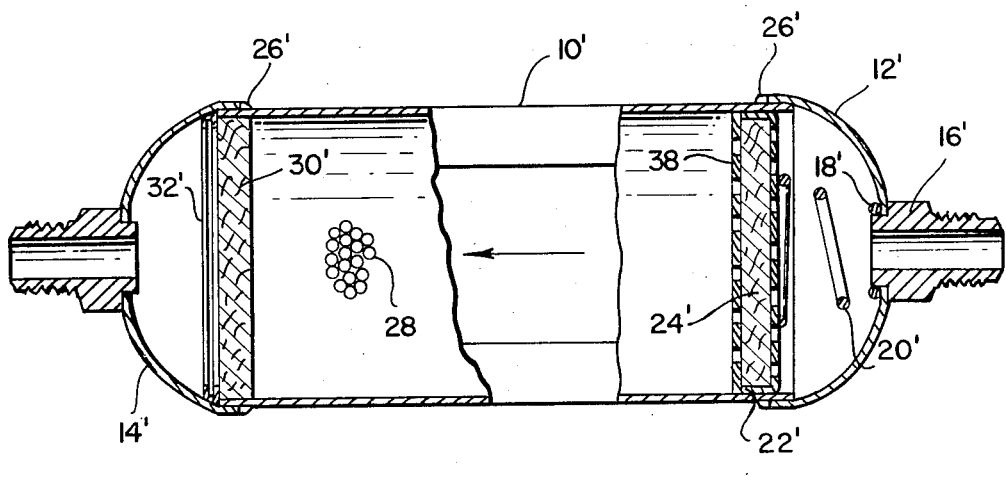
FIG. 2 is a horizontal sectional view of applicant's filter drier, modified to provide enhanced filtering characteristics.

In FIG. 2, there is illustrated the improved device embodying desiccant housing 10' with end closure members 12' and 14' secured by brazing material 26 or the like. Desiccant 28 is supported intermediate exit filter 30' and entrance filter 24' which is removably seated in the mediate perforated cover plate 38 and cup 22'. A compression means 20' abuts the entrance side of cup 22' and encircles the entrance port 16, as at 18'. As the compression spring 20' urges the entire cover plate 38 and filter cup assembly against the desiccant 28, there is no compressing of the filter pad 24'.

In this design, the perforated cover plate and cup have been designed to have greatly increased open area to facilitate the use of all the surface cross-section of the fiberglass. Conventional plates have 30 percent open area. Applicant's perforated support plate will use from 50 to 75 percent open area perforated metal. In addition, the density of the first stage or upper fiberglass pad in the cup has been decreased below the density of the outlet stage or lower fiberglass pad to enable the combination of coarse inlet stage and fine outlet stage pads to both do filtering and filter a greater amount of dirt to low micron values. The lighter density inlet stage pad filters only larger size dirt particles, and the smaller size dirt particles are filtered out by the higher density outlet stage fiberglass filter pad. Thus, through all these changes, the maximum filtration capabilities of the combination of two fiberglass pads is utilized. I have found the optimum for this use to be 2 lb./cu.ft. density for the inlet stage fiberglass filter pad and 3 lb./cu.ft. density for the outlet stage fiberglass pad.

In addition, this assembly makes possible the use of much greater spring forces on the beads, thereby keeping them compacted and less subject to attrition due to vibration and flow turbulence.

In investigating the problems, applicant determined that there were two different filtration blockages present. One was the basic fact that the only filter volume of the upper fiberglass pad that was being utilized was the area of the pad below the holes in the perforated metal support plate and this area was used only for a depth of about 0.030 in. into the pad. As the support plate had an open area of only 30 percent of its area, only a very small percent of the inlet stage or upper pad was being utilized. The outlet stage or lower pad had practically no dirt on its surface and none in its interior.

The second observation was that, in units that clogged very quickly with as little as 0.2 gram of test dirt, the fiberglass pad was actually glued to the support plate and had to be "peeled" off. This was due to the fact that the fiberglass pads had extremely heavy coatings of binder resin on one side of the pad. A characteristic of this insulating grade fiberglass is that one side always has more binder resin than the other and in some cases the binder resin is excessive. When this heavy coating of binder resin is in contact with the metal pad support, heat from brazing the closure to the shell is transmitted through the metal pad support, and, due to the intimate contact between filter pad and pad support under the spring load, the binder on the filter pad melts and glues itself to the pad support on cooling. In such cases, the filtration area is definitely limited to the 30 percent open area and, in addition, the heavy coating of binder resin is taking up, say, 50 percent of the 30 percent open area of the holes. Any small amount of dirt hitting this type of situation at one time will cause immediate plugging and a high pressure drop.

Since this heat flow into the support plate is inherent in manufacture of filter drier housing, it was a first step to go to a perforated metal pad support of much greater open area. Applicant supports his fiberglass pad in a cup with a cover plate, decreasing the density of the inlet stage pad and distributing the filtration between both upper and lower filter pads and increasing the spring force.

I claim:

1. A filter drier of the type used in refrigeration systems and having a desiccant material enclosed within a filtering housing, comprising:
  A. a housing having an entrance port and an exit port and a medial desiccant storage chamber;
  B. a first filter mount supported adjacent said entrance port and including:
    i. a perforated cover plate extending to the walls of said housing;
    ii. a cup having its open end engaging said cover plate on its entrance port side;
    iii. a first compressible filter supported intermediate said cup and said cover plate the first filter and the cup being substantially coextensive with said cover plate; and
    iv. means interposed between said cup and said entrance port yieldably urging said cup towards said cover plate;
  C. a second filter mount supported adjacent said exit port and including:
    i. a perforated pad support extending to the walls of said housing; and
    ii. a fibrous second filter adjacent to said pad support on its desiccant storage chamber side.

2. A filter drier as in claim 1, wherein said first filter has a density less than said second filter.

3. A filter drier as in claim 2, wherein both said filters are fiberglass.

4. A filter drier as in claim 3, wherein said first filter has a density of 2 lb./cu. ft. and said second filter has a density of 3 lb./cu. ft.

5. A filter drier as in claim 4, wherein said filters have a diameter substantially identical to the inner diameter of said desiccant storage chamber.

6. A filter drier as in claim 1, wherein said cover plate and cup limits the degree of compression of said first filter by the media yieldably urging the cup.

7. A filter drier as in claim 6, wherein said perforated cover plate and cup supported in said first filter mount has 50 to 75 percent open area.

8. A filter drier as in claim 1, wherein the means yieldably urging the cup is in the form of a helix abutting said entrance port at one end and abutting said cup at its other end.

* * * * *